US012673564B2

(12) United States Patent
Na et al.

(10) Patent No.: US 12,673,564 B2
(45) Date of Patent: Jul. 7, 2026

(54) METHOD FOR CHARGING MICROMOBILITY AND CHARGING STAND THEREFOR

(71) Applicants:Hyundai Motor Company, Seoul (KR); Kia Corporation, Seoul (KR)

(72) Inventors: Ho Kwon Na, Dangjin-si (KR); Yong Kyu Yoo, Yongin-si (KR); Jae Dong Shin, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 732 days.

(21) Appl. No.: 18/297,359

(22) Filed: Apr. 7, 2023

(65) Prior Publication Data

US 2024/0067006 A1 Feb. 29, 2024

(30) Foreign Application Priority Data

Aug. 31, 2022 (KR) .......................... 1020220110122

(51) Int. Cl.
 *B60L 53/126* (2019.01)
 *B60L 53/122* (2019.01)
 *B60L 53/39* (2019.01)
(52) U.S. Cl.
 CPC ........... *B60L 53/126* (2019.02); *B60L 53/122* (2019.02); *B60L 53/39* (2019.02); *B60L 2200/24* (2013.01); *B60L 2210/42* (2013.01)
(58) Field of Classification Search
 CPC ...... B60L 53/126; B60L 53/122; B60L 53/39; B60L 2200/24; B60L 2210/42; B60L 2200/12; B60L 53/12; B60L 53/14; B60L 2210/30; B60L 2210/40; B62H 3/02; B62H 2003/005; B62K 3/002; H02J 50/10
See application file for complete search history.

(56) References Cited

U.S. PATENT DOCUMENTS

| 10,658,865 B2 * | 5/2020 | Misawa | ................... | B60L 53/14 |
| 10,919,405 B2 * | 2/2021 | Moravick | ............... | B60L 53/31 |
| 11,018,528 B2 * | 5/2021 | Sugiyama | ............... | H02J 50/12 |
| 12,263,742 B2 * | 4/2025 | Cho | ........................ | B60L 53/12 |

(Continued)

FOREIGN PATENT DOCUMENTS

| CN | 205319779 U | * | 6/2016 |
| CN | 205644792 U | * | 10/2016 |

(Continued)

*Primary Examiner* — Jared Fureman
(74) *Attorney, Agent, or Firm* — Fish & Richardson P.C.

(57) ABSTRACT

A method for charging a micromobility and a charging stand therefor are provided. The charging stand includes a power device that supplies power, a mounting part including a charging part and a holding part configured to dock with at least one micromobility, a power conversion device including at least one converter or an inverter, and a control device that executes an operation for charging the at least one micromobility based on that the mounting part is mounted on the at least one micromobility. The control device receives power supplied from outside by means of the power device, converts the supplied power into a specified DC voltage, outputs at least a portion of the specified DC voltage to the charging part, converts the specified DC voltage into a specified AC voltage, and outputs at least a portion of the specified AC voltage to the charging part.

20 Claims, 9 Drawing Sheets

(56)            References Cited

U.S. PATENT DOCUMENTS

| 2010/0228405 | A1 * | 9/2010 | Morgal | B62H 3/00 |
| | | | | 701/1 |
| 2018/0069416 | A1 * | 3/2018 | Brace | B60L 53/30 |
| 2019/0263281 | A1 * | 8/2019 | Wang | B60L 53/60 |
| 2020/0189683 | A1 * | 6/2020 | Chen | B60L 53/30 |
| 2022/0258624 | A1 * | 8/2022 | Deppe | B60L 53/14 |
| 2023/0182610 | A1 * | 6/2023 | Matsushita | B60L 53/665 |
| | | | | 700/297 |
| 2023/0241986 | A1 * | 8/2023 | Saal | B60L 53/12 |
| | | | | 320/108 |
| 2023/0278443 | A1 * | 9/2023 | Deppe | B62H 5/20 |
| | | | | 320/109 |
| 2023/0382244 | A1 * | 11/2023 | Park | B60L 53/122 |
| 2024/0208346 | A1 * | 6/2024 | Kim | B60L 53/12 |
| 2025/0262966 | A1 * | 8/2025 | Kim | B60L 53/31 |

FOREIGN PATENT DOCUMENTS

| CN | 106542023 | | | 3/2017 | | |
| CN | 107035170 | | | 8/2017 | | |
| CN | 107650707 | A | * | 2/2018 | | B60L 53/31 |
| CN | 105209331 | B | * | 10/2018 | | B62K 11/14 |
| CN | 222202291 | U | * | 12/2024 | | |
| KR | 102031244 | B1 | * | 10/2019 | | B62H 3/00 |
| KR | 20200019374 | A | * | 2/2020 | | B60L 53/60 |
| KR | 10-2020-0030652 | | | 3/2020 | | |
| KR | 10-2021-0003536 | | | 1/2021 | | |
| KR | 102218319 | B1 | * | 2/2021 | | B62H 3/00 |
| KR | 10-2282565 | | | 7/2021 | | |
| KR | 10-2341176 | | | 12/2021 | | |
| WO | WO-2022186407 | A1 | * | 9/2022 | | B62K 3/00 |

* cited by examiner

200

METHOD FOR CHARGING MICROMOBILITY AND CHARGING STAND THEREFOR

CROSS-REFERENCE TO RELATED APPLICATION

This application claims the benefit of priority to Korean Patent Application No. 10-2022-0110122, filed in the Korean Intellectual Property Office on Aug. 31, 2022, the entire contents of which are incorporated herein by reference.

TECHNICAL FIELD

The present disclosure relates to a method for charging a micromobility device and a charging stand therefor, and more particularly, relates to a structure of a charging stand for mounting and charging an electric kickboard wirelessly and/or wired and a method for charging the electric kickboard.

BACKGROUND

Recently, interest in micromobility (MM), which typically refers to transportation configured to be movable using electrical energy, has been increased to reduce carbon emissions. MM devices include electric wheels, electric kickboards, electric bicycles, stick boards, push scooters, roller boards, roller scooters, and kick scooter boards.

Compared to vehicles, MM devices are relatively convenient to use and easy to access. However, as users increase, various problems may occur.

For example, a large number of MM devices are left unattended on the sidewalk due to the lack of stands. This may impair the aesthetics of the city and cause inconvenience to pedestrians walking on the sidewalk or accidents.

For example, electric bike or electric scooter rental service providers have to incur significant costs to directly collect and recharge their unattended devices.

For example, a user who personally uses his or her MM device may experience concerns about theft or a decrease in usability associated with charging due to the lack of facilities for charging and mounting.

SUMMARY

The present disclosure has been made to solve the above-mentioned problems.

An aspect of the present disclosure provides a method for charging a micromobility to provide a space capable of conveniently mounting the micromobility such that it is possible for a user to use both of wireless charging and wired charging of the micromobility and a charging stand therefor.

Another aspect of the present disclosure provides a method for charging a micromobility to provide a charging function using power generated by means of sunlight and provide a charging function by power selectively received from the outside, when there is a restriction on the charging function due to the influence of weather or the like and a charging stand therefor.

Another aspect of the present disclosure provides a method for charging a micromobility to provide convenience such as movement, charging, or storage to the user who personally uses the micromobility and reduce unnecessary cost consumption of rental service providers and a charging stand therefor.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a charging stand configured to mount and charge at least one micromobility may include a power device that supplies power, a mounting part including a charging part and a holding part configured to dock with the at least one micromobility, a power conversion device including at least one converter or an inverter, and a control device that executes an operation for charging the at least one micromobility based on that the mounting part is mounted on the at least one micromobility.

In some implementations, the control device may be configured to receive power supplied from outside, by means of the power device, convert the supplied power into a specified direct current (DC) voltage by means of the power conversion device, output at least a portion of the specified DC voltage to the charging part, convert the specified DC voltage into a specified alternating current (AC) voltage by means of the power conversion device, and output at least a portion of the specified AC voltage to the charging part.

In some implementations, the charging part may include a wireless charging part. For example, the wireless charging part may include a housing including an opening, a coil disposed on one region of the opening and configured to wirelessly supply power to the at least one micromobility, a front case configured to cover one surface of the coil, the one surface facing the at least one micromobility, a rear case configured to cover the other surface opposite to the one surface of the coil and include a buffer spring coupled in a direction facing the housing, and a hinge configured to be coupled to the coil and the housing.

In some implementations, the charging part may include a wireless charging part. For example, the control device may be configured to transmit the specified AC voltage to the at least one micromobility by means of the wireless charging part, when a separation distance between the wireless charging part and the at least one micromobility is within a specified distance.

In some implementations, the power conversion device may include an AC/DC converter and a DC/AC inverter. For example, the control device may be configured to identify a load characteristic of the at least one micromobility, determines a magnitude of a voltage for charging the at least one micromobility, based on the identified load characteristic, convert the supplied power into the specified DC voltage, using the AC/DC converter, convert the specified DC voltage into the specified AC voltage having the determined magnitude, using the DC/AC inverter, and transmit the specified AC voltage to the at least one micromobility by means of the wireless charging part.

In some implementations, the charging part may include a wired charging part. For example, the control device may be configured to transmit the specified DC voltage to the at least one micromobility by means of the wired charging part, when the wired charging part and the at least one micromobility are connected with each other.

In some implementations, the power conversion device may include an AC/DC converter and a DC/AC inverter. For example, the control device may be configured to identify a load characteristic of the at least one micromobility connected with the wired charging part, determines a magnitude of a voltage for charging the at least one micromobility, based on the identified load characteristic, convert the supplied power into the specified DC voltage having the determined magnitude, using the AC/DC converter, and transmit the specified DC voltage to the at least one micromobility by means of the wired charging part.

In some implementations, the charging stand may further include a solar collector formed in the charging stand and including at least one solar panel configured to generate solar power using sunlight, energy storage storing the solar power, a controller electrically connected with the solar collector and the energy storage, and a DC/DC converter and a DC/AC inverter included in the power conversion device.

In some implementations, the charging part may include a wireless charging part and a wired charging part. For example, the control device may be configured to identify the solar power generated by means of the solar collector, using the controller, output at least a portion of the identified solar power to the energy storage or the DC/DC converter by means of the controller, convert the at least a portion of the solar power into the specified DC voltage, using the DC/DC converter, and output the specified DC voltage to the wired charging part or the DC/AC inverter, convert the specified DC voltage into the specified AC voltage, using the DC/AC inverter, and output the specified AC voltage to the wireless charging part, and transmit the specified DC voltage or the specified AC voltage to the at least one micromobility by means of the wired charging part or the wireless charging part.

In some implementations, the charging stand may further include a watt-hour meter configured to measure an amount of power transmitted to the at least one micromobility by means of the mounting part, a power indicator lamp configured to display a power state of the charging stand using a lamp with a plurality of colors, and a power fuse and a protective relay formed in at least a portion of a transmission and reception path among the control device, the mounting part, and the at least one micromobility.

In some implementations, the charging stand may further include one main breaker and a plurality of sub-breakers. For example, the one main breaker may include an earth leakage breaker, and the plurality of sub-breakers may include a power distribution breaker.

In some implementations, the charging stand may further include at least one display device configured to display content. The control device may be configured to display a charging state of each of the at least one micromobility mounted on the mounting part on the at least one display device, when it is identified that a user exists in a region adjacent to the charging stand.

In some implementations, the control device may be configured to display an advertisement on the at least one display device and stop displaying the advertisement on the at least one display device, when it is identified that the user does not exist in the region adjacent to the charging stand.

In some implementations, the control device may be configured to identify a user input for displaying an advertisement on the at least one display device and always display the advertisement on the at least one display device, based on identifying the user input.

In some implementations, the charging stand may further include at least one display device configured to display content. the control device may be configured to first block power transmitted to the at least one display device, when the solar power is less than a threshold.

In some implementations, the charging stand may further include a plurality of mounting parts included in the mounting part and electrically connected with the control device. For example, the control device may be configured to identify power supply priorities or power blocking priorities of the plurality of mounting parts, when the solar power is less than a threshold, and supply power for charging the at least one micromobility to the plurality of mounting parts, based on the power supply priorities or the power blocking priorities.

According to another aspect of the present disclosure, a method for charging a micromobility may include receiving, by a control device, power supplied from the outside using a power device, based on that at least one micromobility is mounted on a mounting part of the charging stand, converting, by the control device, the received supplied power into specified DC voltage using a power conversion device, outputting, by the control device, at least a portion of the specified DC voltage to a charging part using the power conversion device, converting, by the control device, the at least a portion of the specified DC voltage into a specified AC voltage using the power conversion device, and outputting, by the control device, at least a portion of the specified AC voltage to the charging part.

In some implementations, the charging part may include a wireless charging part. For example, the method may further include transmitting, by the control device, the specified AC voltage to the at least one micromobility by means of the wireless charging part, when a separation distance between the wireless charging part and the at least one micromobility is within a specified distance.

In some implementations, the power conversion device may include an AC/DC converter and a DC/AC inverter. For example, the method may further include determining, by the control device, a magnitude of a voltage for charging the at least one micromobility, converting, by the control device, the supplied power into the specified DC voltage using the AC/DC converter, converting, by the control device, the specified DC voltage into the specified AC voltage having the determined magnitude using the DC/AC inverter, and transmitting, by the control device, the specified AC voltage to the at least one micromobility by means of the wireless charging part.

In some implementations, the charging part may include a wired charging part. For example, the method may further include transmitting, by the control device, the specified DC voltage to the at least one micromobility by means of the wired charging part, when the wired charging part and the at least one micromobility are connected with each other.

In some implementations, the power conversion device may include an AC/DC converter and a DC/AC inverter. For example, the method may further include identifying, by the control device, a load characteristic of the at least one micromobility connected with the wired charging part, determining, by the control device, a magnitude of a voltage for charging the at least one micromobility based on the identified load characteristic, converting, by the control device, the supplied power into the specified DC voltage having the determined magnitude using the AC/DC converter, and transmitting, by the control device, the specified DC voltage to the at least one micromobility by means of the wired charging part.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
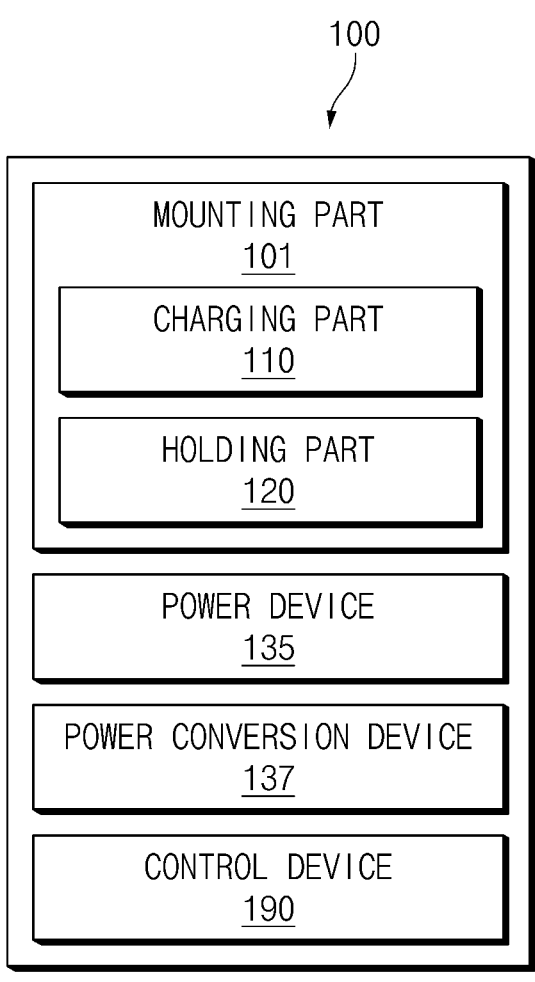
FIG. 1 is a block diagram illustrating components included in a charging stand.
Figure 2:
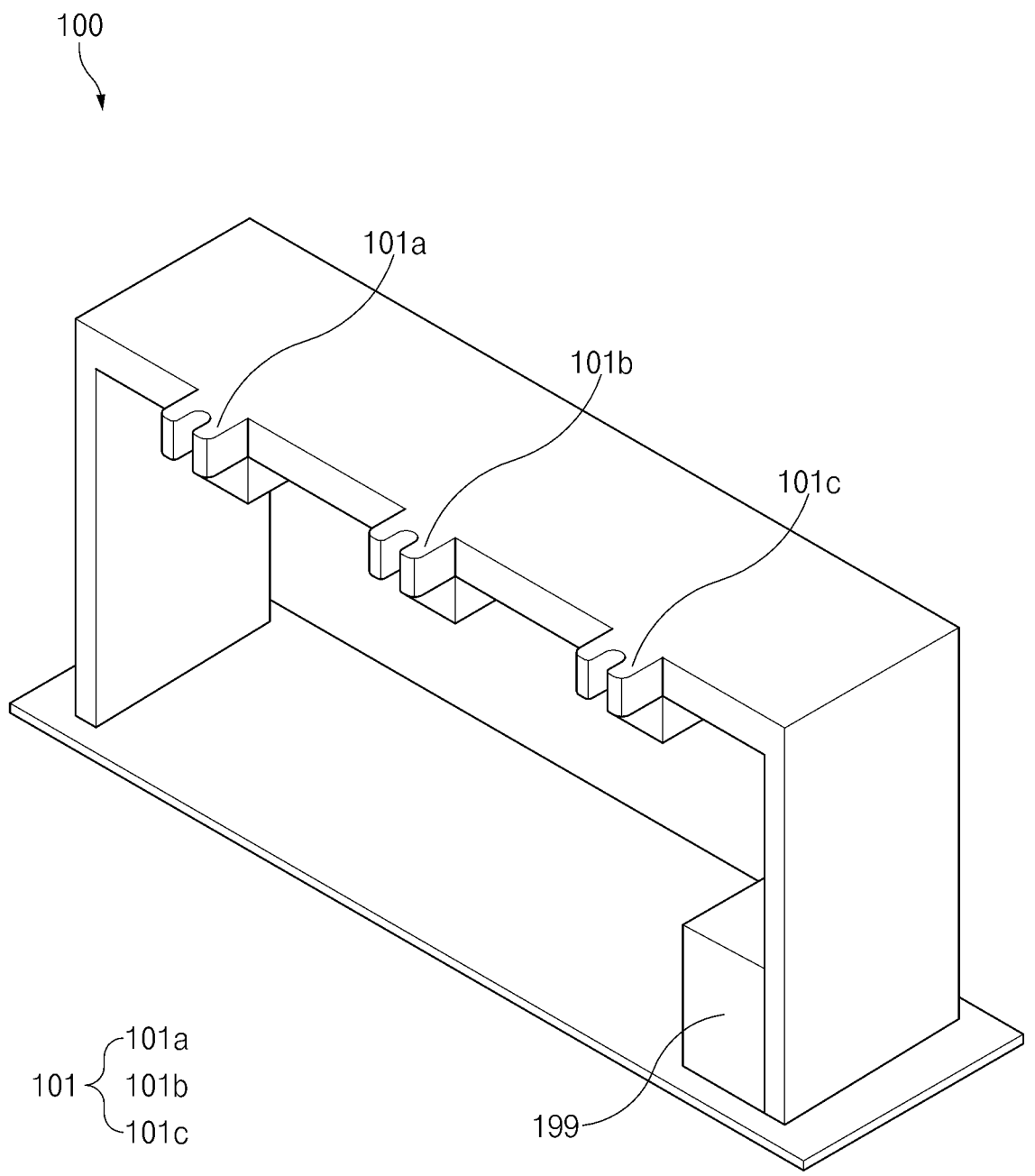
FIG. 2 is a perspective view schematically illustrating a charging stand.
Figure 3:
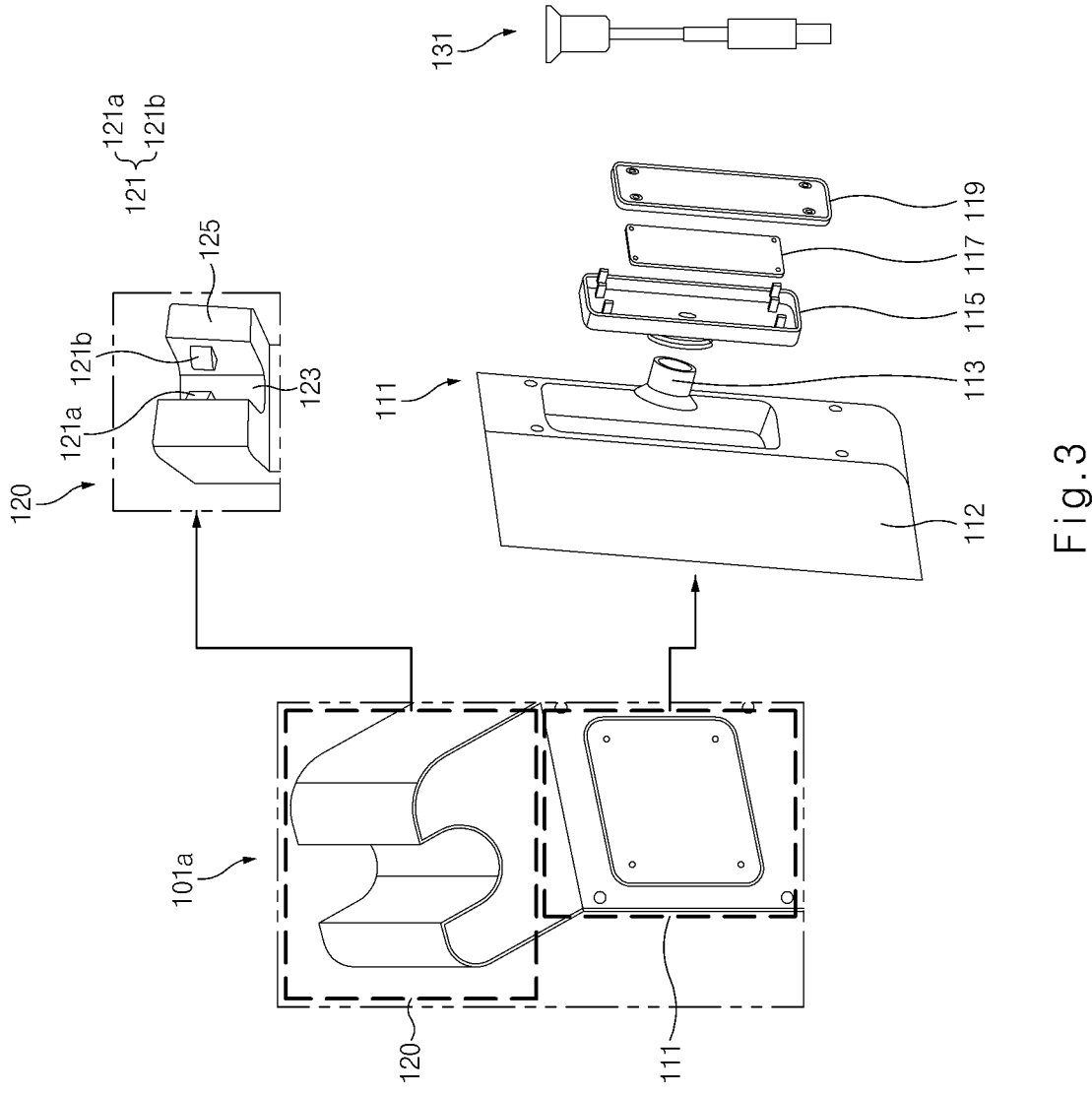
FIG. 3 is a drawing illustrating in detail a configuration of a mounting part included in a charging stand.

FIG. 1 is a block diagram illustrating components included in a charging stand 100. FIG. 2 is a perspective view schematically illustrating a charging stand 100. FIG. 3 is a drawing illustrating in detail a configuration of a mounting part 101 included in a charging stand 100.

Referring to FIG. 1, in some implementations, the charging stand 100 may include a mounting part 101, a power device 135, a power conversion device 137, and a control device 190.

For example, the mounting part 101 may include a charging part 110 and a holding part 120. The case where the charging stand 100 includes the one mounting part 101 is illustrated in FIG. 1, and this is illustrative. In some implementations, the charging stand 100 may further include a plurality of mounting parts (e.g., a first mounting part 101*a*, a second mounting part 101*b*, and/or a third mounting part 101*c* of FIG. 2) which are the same as or similar to the mounting part 101 shown in FIG. 1. For example, the charging stand 100 may further include at least one display device. As an example, the display device may include a display which displays a plurality of pieces of content including information associated with an operation state of the charging stand 100, advertising information, manager information, and/or user information.

As an example, the charging part 110 may include a wireless charging part 111 and/or a wired charging part.

As an example, the wireless charging part 111 may include a housing 112, a coil 117, a front case 119, a rear case 115, and a hinge 113. The structure of the wireless charging part 111 may refer to a description of FIG. 3, which will be described below, in detail. For example, the wireless charging part 111 may transmit power for charging the micromobility by means of the coil 117 to a part (e.g., an RX module) of the micromobility in a state where it is in contact with the micromobility and/or a state where it is spaced apart from the micromobility within a specified distance.

As an example, the wired charging part may include at least one wired charging terminal 131. The wired charging terminal 131 may include, for example, a cable connected with a part (e.g., a connector) of the micromobility. The wired charging part may be connected with the micromobility in a wired manner to transmit power for charging the micromobility to a part (e.g., an RX module) of the micromobility through the wired charging terminal 131.

As an example, the holding part 120 may be a component where the micromobility docks with the charging stand 100.

The holding part 120 may include, for example, at least one a prefabricated fastening module 121, a receiving member 123, and a support 125. The micromobility may be mounted in a fixed state by fastening of a plurality of binding members 121*a* and 121*b* included in the prefabricated fastening module 121. One region of the micromobility may be received in the receiving member 123 of the holding part 120. The support 125 of the holding part 120 may be configured such that the holding part 120 is fixed to a part of the charging stand 100.

For example, the power device 135 may receive power supplied from the outside.

As an example, the power device 135 may receive power supplied from an external power station and may transmit at least a portion of the received supplied power to the power conversion device 137 or the charging part 110.

For example, the power conversion device 137 may include at least one converter or an inverter.

As an example, the power conversion device 137 may include an alternating current/direct current (AC/DC) converter, a DC/AC inverter, and/or a DC/DC converter.

As an example, the power conversion device 137 may convert a DC voltage into an AC voltage or may convert an AC voltage into a DC voltage, using the converter and/or the inverter.

For example, the control device 190 may be electrically connected with some of the components of the mounting part 101, the power device 135, and/or the power conversion device 137. As an example, the control device 190 may be electrically connected with the wired charging part and/or the wireless charging part 111 included in the charging part 110. As an example, the control device 190 may be electrically connected with the power device 135 and the power conversion device 137.

For example, the control device 190 may receive power supplied from the outside by means of the power device 135. As an example, the control device 190 may receive a commercial voltage from the external power station by means of the power device 135.

For example, the control device 190 may convert the received supplied power by means of the power conversion device 137.

As an example, the control device 190 may convert the supply power into a specified DC voltage, using the AC/DC converter included in the power conversion device 137. The supplied power may correspond to 220 V and may be converted into 24 volts of direct current (VDC), 36 VDC, or 48 VDC by the AC/DC converter, but such numerical values are illustrative. In some implementations, the magnitude of the supplied power may vary with a country, a power station, a location, an external situation, and/or whether the charging stand 100 is supported. The control device 190 may determine, for example, a magnitude of a voltage to be converted based on a load characteristic of the micromobility for charging. For example, the determined magnitude may be 36 VDC or 48 VDC, but such numerical values are illustrative.

As an example, the control device 190 may convert at least a portion of the specified DC voltage into an AC voltage by the means of the DC/AC inverter included in the power conversion device 137. The control device 190 may wirelessly transmit, for example, the AC voltage converted using the DC/AC inverter to the outside (e.g., the RX module of the micromobility).

The components of the charging stand 100, which are illustrated in FIG. 1, are illustrative, and implementations of the present disclosure are not limited thereto.

Figure 6A:
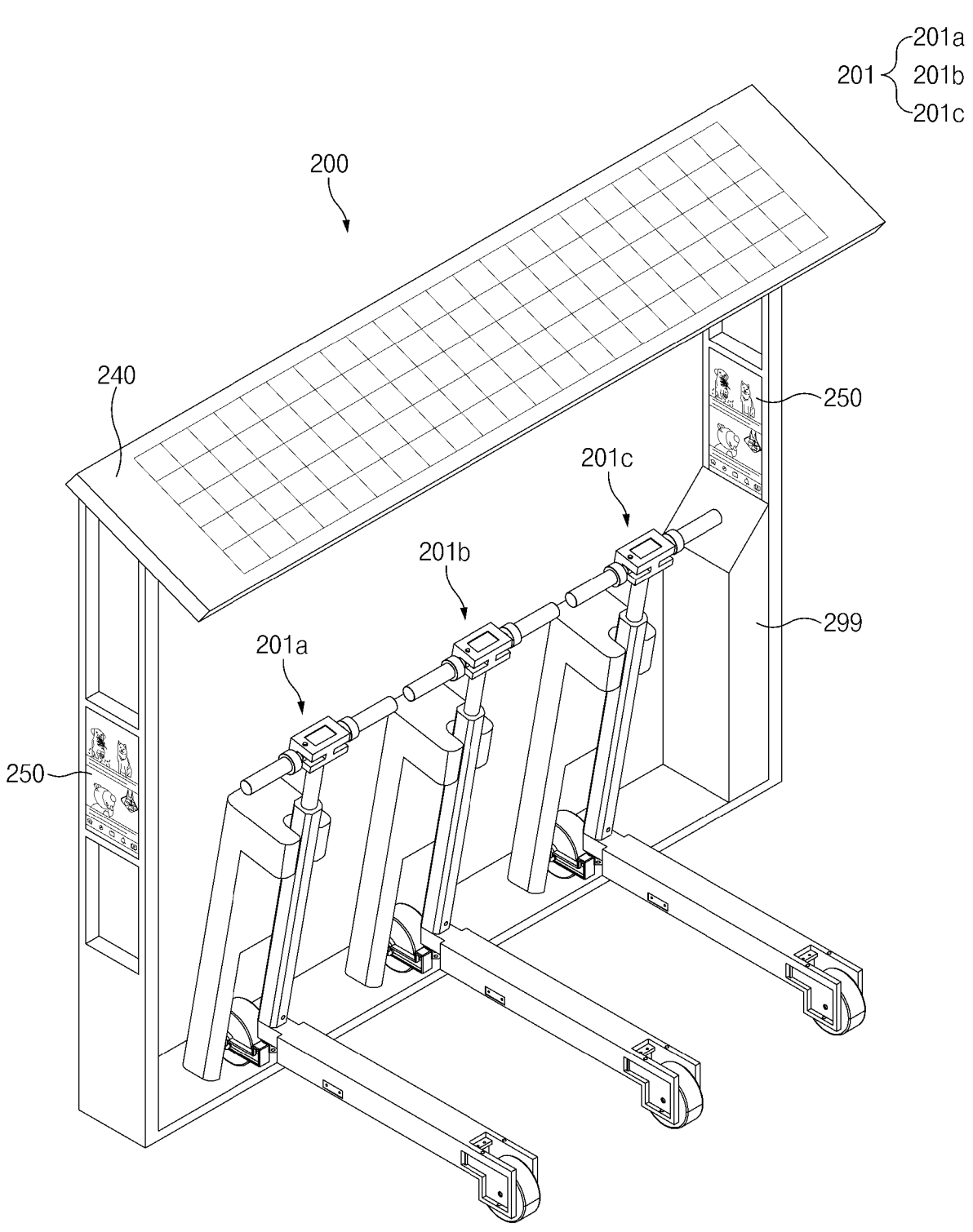
FIG. 6A is a perspective view schematically illustrating a charging stand.

In some implementations, the charging stand 100 may further at least one display device (e.g., a display device 250 of FIG. 6A). The display device may include a display (or an advertising panel) which displays various pieces of content.

For example, the display device may identify mounting parts on which micromobilities are mounted among the plurality of mounting parts included in the charging stand 100 and may display amounts of power of the identified mounting parts, a state of charge of each of the mounted micromobilities, and/or information about each of the micromobilities.

As an example, when it is identified that a user exists in a region adjacent to the charging stand 100, the display device may display a state of charge of the micromobility mounted on the mounting part 101 under control of the control device 190. For example, the charging stand 100 may further include sensor(s) (e.g., a gesture sensor, a gyro sensor, an acceleration sensor, a proximity sensor, an infrared (IR) sensor, and/or a biometric sensor). The charging stand 100 may sense an environmental state (e.g., motion of the user) outside the charging stand 100, using the sensor, and may identify that the user exists in the region adjacent to the charging stand 100. For example, the charging stand 100 may further include a communication module. The charging stand 100 may communicate with an external electronic device (e.g., a user terminal) over a specified network (e.g., a short range communication network such as Bluetooth, Wi-Fi Direct, or infrared data association (IrDA)), using the communication module (e.g., a cellular communication module, a short range wireless communication module, or a global navigation satellite system (GNSS) communication module) and may identify that the user exists in the region adjacent to the charging stand 100 based on the communication state.

For example, the display device may display an advertisement.

As an example, when it is identified that the user does not exist in the region adjacent to the charging stand 100, the display device may be configured to stop displaying the advertisement on the display device under control of the control device 190.

As an example, the display device may be configured to always display an advertisement under control of the control device 190. The control device 190 may identify a user input associated with displaying the advertisement on the display device. As an example, the user input may be a touch input on one region of the display device. As an example, the user input may be a control signal transmitted to the control device 190. The control device 190 may control the display device to always display an advertisement, based on identifying the user input.

FIG. 2 is a perspective view schematically illustrating a charging stand 100.

Referring to FIG. 2, in some implementations, the charging stand 100 may include a plurality of mounting parts 101 and a control device 190. For example, the charging stand 100 may include a first mounting part 101a, a second mounting part 101b, and a third mounting part 101c.

In some implementations, each of the first mounting part 101a, the second mounting part 101b, and the third mounting part 101c may include components (e.g., a charging part 110 and/or a holding part 120) which are the same as the above-mentioned configuration included in the mounting part 101 of FIG. 1.

For example, each of the plurality of mounting parts 101 may transmit power for charging one micromobility. As an example, one or more of the plurality of mounting parts may operate at the same time. Power transmitted by the plurality of mounting parts 101 may include at least a portion of commercial power received by the control device 190 by means of a power device 135 from the outside (e.g., a power station).

In some implementations, the power device 135, a power conversion device 137, and/or the control device 190 may be arranged together with a control box 199 disposed on one region of the charging stand 100. The power device 135, the power conversion device 137, and/or the control device 190 may be arranged spaced apart from each other. For example, the control box 199 may be defined as a box having a material which is the same as or similar to a frame of the charging stand 100.

In some implementations, the charging stand 100 may further include a component. For example, the charging stand 100 may further include a watt-hour meter (e.g., an integrated watt-hour meter), a power indicator lamp, a power fuse, a protective relay, and/or a plurality of breakers. At least some of the above components may be mounted on, for example, the control box 199 together with the control device 190.

For example, the watt-hour meter may measure an amount of power transmitted to at least one micromobility by means of the plurality of mounting parts 101. As an example, the watt-hour meter may measure each of amounts of power transmitted from the first mounting part 101a, the second mounting part 101b, and/or the third mounting part 101c.

For example, the power indicator lamp may include an illuminant which displays power states of the charging stand 100 in a plurality of different colors. As an example, when the charging stand 100 is able to provide a normal charging function, the power indicator lamp may control the illuminant to emit a blue color. As another example, when it is difficult for the charging stand 100 to provide the normal charging function, the power indicator lamp may control the illuminant to emit a red color.

For example, the power fuse and the protective relay may be formed on at least a portion of a transmission and reception path among the control device 190, the mounting part 101, and the at least one micromobility. As an example, the power fuse may prevent a failure due to deterioration or heating of at least one line included in the transmission and reception path. As an example, the protective relay may calculate an operation condition of an electrical circuit included in the transmission and reception path and may trip the breaker included in the control device 190 when the failure is detected.

For example, the plurality of breakers may be included in the control device 190, but this is illustrative. The plurality of breakers may include one main breaker and a plurality of sub-breakers. As an example, the one main breaker may include an earth leakage breaker. As an example, the plurality of sub-breakers may include a power distribution breaker. The plurality of breakers may be tripped by, for example, an operation of the protective relay.

FIG. 3 is a drawing illustrating in detail a configuration of a mounting part 101 included in a charging stand 100.

Referring to the left drawing of FIG. 3, in some implementations, the charging stand 100 may include a first mounting part 101a. The first mounting part 101a may include a wireless charging part 111 and a holding part 120. A description of the first mounting part 101a, which will be described below, may be referred to a second mounting part 101*b* and a third mounting part 101*c* of FIG. 2 in the same manner.

For example, the wireless charging part 111 may transmit power for charging a micromobility by means of a coil 117 to in a state where it is in contact with the micromobility and/or a state where it is spaced apart the micromobility within a specified distance. For example, when a separation distance between the wireless charging part 111 and at least one micromobility is within a specified distance, a control device 190 may transmit power for charging to the at least one micromobility.

In some implementations, the holding part 120 may be a component where the micromobility docks with the charging stand 100.

Referring to the middle drawing of FIG. 3, in some implementations, the wireless charging part 111 may include a housing 112, a coil 117, a front case 119, a rear case 115, and a hinge 113.

In some implementations, the housing 112 may include an opening formed in one region. For example, when the micromobility docks, the housing 112 may include an opening formed in at least one region of one surface facing the micromobility. For example, the coil 117, the front case 119, the rear case 115, and the hinge 113 may be arranged on one region of the opening.

In some implementations, the coil 117 may be disposed on one region of the opening to wirelessly supply power to the micromobility. For example, when a part (e.g., an RX module) of the micromobility is in contact with the front case 119 and/or is spaced apart from the front case 119 within a specified distance, the coil 117 may transmit power for charging to the RX module of the micromobility.

In some implementations, the front case 119 may be configured to cover one surface of the coil 117, which is toward the micromobility. For example, the front case 119 may protect the coil 117 from an impact generated from the outside or a contact with an external object.

In some implementations, the rear case 115 may be configured to cover the other surface opposite to the one surface of the coil 117 covered by the front case 119. For example, the rear case 115 may include a buffer spring to which the coil 117 is coupled in a direction facing the housing 112.

In some implementations, the hinge 113 may be configured to couple the rear case 115 to the opening formed in the one region of the housing 112. For example, the hinge 113 may be coupled to the buffer spring included in the rear case 115 and a part of the housing 112.

Referring to the right drawing of FIG. 3, in some implementations, the first mounting part 101*a* may further include a wired charging terminal 131.

In some implementations, the wired charging terminal 131 may be one component of a wired charging part included in the charging part 110. For example, the wired charging terminal 131 may be configured to protrude to a side surface of the first mounting part 101*a*. For example, the wired charging terminal 131 may include a cable connected with a part (e.g., a connector) of the micromobility. The wired charging terminal 131 may be connected with the micromobility in a wired manner to transmit power for charging the micromobility. The above-mentioned description of the arrangement structure of the wired charging terminal 131 is illustrative. In some implementations, the wired charging terminal 131 may be configured to protrude to another region except for the side surface of the first mounting part 101*a*.

The above-mentioned description of the charging stand 100 of FIGS. 1 to 3 is illustrative. In some implementations, the charging stand 100 may include four or more mounting parts.

Figure 4:
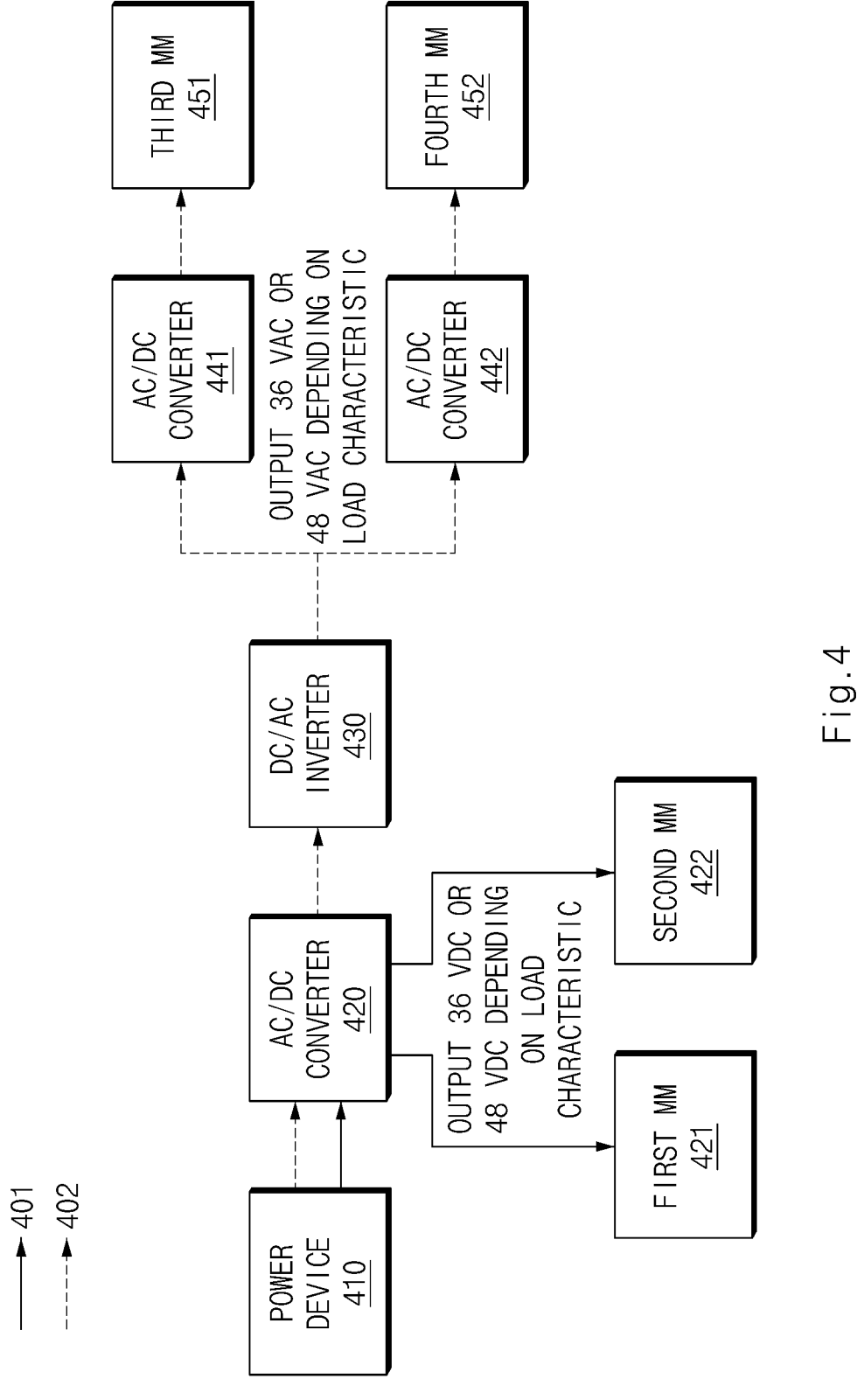
FIG. 4 is a drawing illustrating operational flow of charging a micromobility in a charging stand.

FIG. 4 is a drawing illustrating operational flow of charging a micromobility (MM) in a charging stand.

In some implementations, reference numeral 401 may be defined as a power flow diagram for wired charging between the charging stand and the micromobility.

In some implementations, reference numeral 402 may be defined as a power flow diagram for wireless charging between the charging stand and the micromobility.

In some implementations, the charging stand (e.g., a charging stand 100 of FIG. 1) may include a power device 410 (e.g., a power device 135 of FIG. 1), an AC/DC converter 420, and a DC/AC inverter 430. For example, the AC/DC converter 420 and the DC/AC inverter 430 may be referred to as one component of a power conversion device (e.g., a power conversion device 137 of FIG. 1) included in the charging stand. The components may be implemented as one component of a control device (e.g., a control device 190 of FIG. 1) of the charging stand.

In some implementations, the charging stand may receive power supplied from the outside. For example, the charging stand may receive supplied power by means of the power device 410 from an external power station. The supplied power may be defined as commercial power having a specified magnitude, which is received from the external power station.

In some implementations, the charging stand may convert supplied power transmitted from the outside through the AC/DC converter 420. For example, the AC/DC converter 420 may convert the supplied power into a DC voltage, based on a control signal transmitted from the control device.

In some implementations, the charging stand may convert the received supplied power into a DC voltage using the AC/DC converter 420. For example, the charging stand may output at least a portion of the specified DC voltage converted using the AC/DC converter 420 to the wired charging part and/or the DC/AC inverter 430.

For example, the charging stand may determine a magnitude of a DC voltage to be converted based on a load characteristic of the micromobility and may convert the received supplied power into a specified DC voltage having the determined magnitude. As an example, the charging stand may determine a magnitude of a DC voltage for charging based on a maximum load current and/or a load voltage range of the micromobility and may convert the received supplied power into the specified DC voltage having the determined magnitude.

In some implementations, the charging stand may transmit the specified DC voltage converted using the AC/DC converter 420 to the micromobility in a wired manner. As an example, the charging stand may transmit the converted specified DC voltage to the micromobility by means of the wired charging part.

For example, when it is identified that a first micromobility (MM) 421 is connected with a wired charging terminal (e.g., a wired charging terminal 131 of FIG. 3) included in the wired charging part, the charging stand may convert a portion of the received supplied power into 36 VDC based on a load characteristic of the first MM 421 and may transmit 36 VDC to the first MM 421 through the wired charging terminal.

For example, when it is identified that a second MM 422 is connected with the wired charging terminal included in the wired charging part, the charging stand may convert a portion of the received supplied power into 48 VDC based on a load characteristic of the second MM 422 and may transmit 48 VDC to the second MM 422 through the wired charging terminal.

In some implementations, the charging stand may convert the specified DC voltage into an AC voltage using the DC/AC inverter 430. For example, the charging stand may output at least a portion of the AC voltage converted using the DC/AC inverter 430 to a wireless charging part (e.g., a wireless charging part 111 of FIG. 3).

For example, the charging stand may determine a magnitude of an AC voltage to be converted based on the load characteristic of the micromobility and may convert the received supplied power into a specified AC voltage having the determined magnitude. As an example, the charging stand may determine a magnitude of a DC voltage for charging based on a maximum load current and/or a load voltage range of the micromobility, may identify an AC voltage having a magnitude corresponding to the determined magnitude, and may convert the specified DC voltage converted by the AC/DC converter 420 into a specified AC voltage having the magnitude using the DC/AC inverter 430.

In some implementations, the charging stand may wirelessly transmit the converted specified AC voltage to the micromobility using the DC/AC inverter 430. As an example, the charging stand may transmit the converted specified AC voltage to the micromobility by means of the wireless charging part.

For example, when it is identified that a third MM 451 is spaced apart from the wireless charging part within a specified distance, the charging stand may wirelessly transmit he determined and converted specified AC voltage of 36 VAC to an RX module of the third MM 451 based on a load characteristic of the third MM 451. The third MM 451 may convert the received AC voltage of 36 VAC into a DC voltage, using the AC/DC converter 441 included in the RX module. As an example, when the distance between the wireless charging part and the third MM 451 is within a specified distance, the charging stand may include a physical contact state between the wireless charging part and the third MM 451.

For example, when it is identified that a fourth MM 452 is spaced apart from the wireless charging part within a specified distance, the charging stand may transmit the determined and converted specified AC voltage of 48 VAC to an RX module of the fourth MM 452 based on a load characteristic of the fourth MM 452. The fourth MM 452 may convert the received AC voltage of 48 VAC into a DC voltage, using the AC/DC converter 442 included in the RX module. As an example, when the distance between the wireless charging part and the fourth MM 452 is within a specified distance, the charging stand may include a physical contact state between the wireless charging part and the fourth MM 452.

Hereinafter, in FIGS. 5 to 7, a description will be given of the charging stand 200 further including components (e.g., a solar collector 240, energy storage 291, and a controller 293) added to the above-mentioned implementations of FIGS. 1 to 4.

Figure 5:
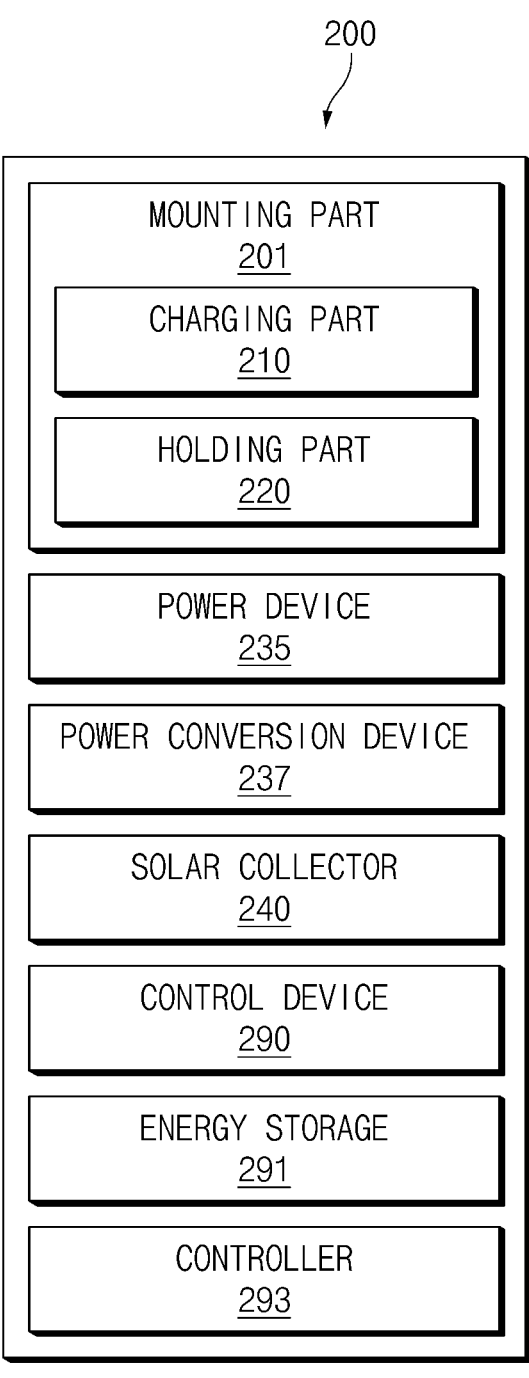
FIG. 5 is a block diagram illustrating components included in a charging stand.
Figure 6B:
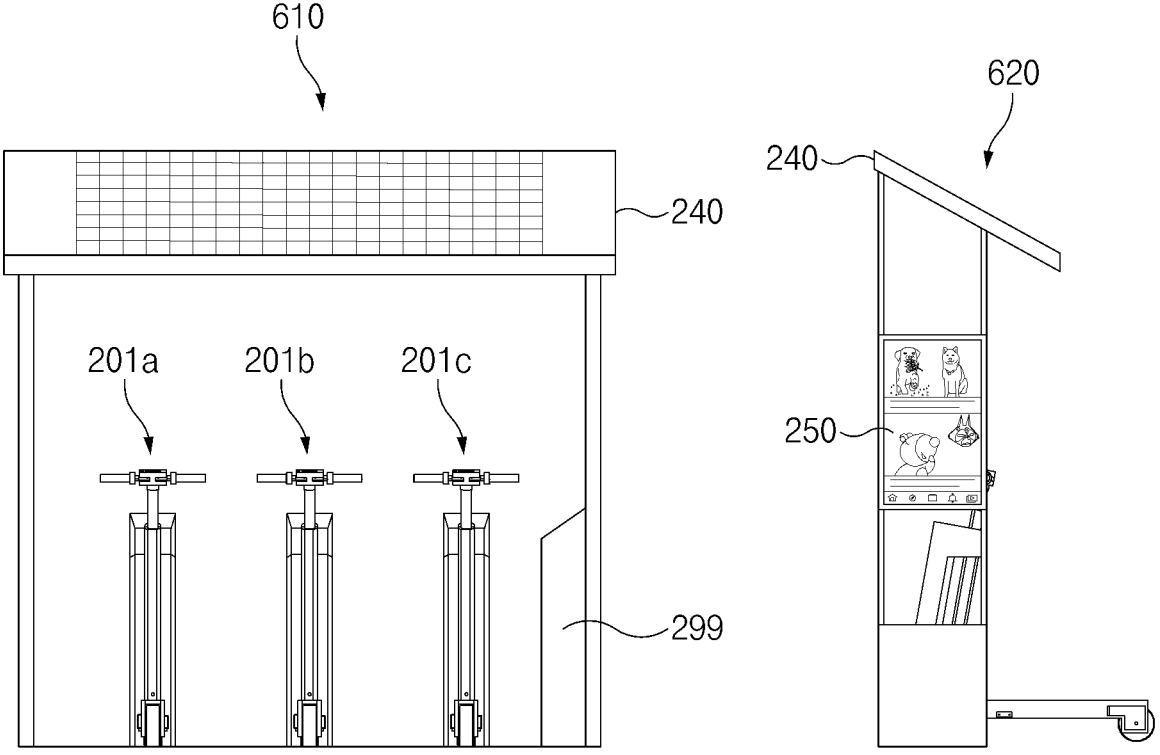
FIG. 6B is a perspective view schematically illustrating a charging stand.

FIG. 5 is a block diagram illustrating components included in a charging stand 200. FIG. 6A is a perspective view schematically illustrating a charging stand. FIG. 6B is a perspective view schematically illustrating a charging stand.

Referring to FIG. 5, a charging stand 200 may include a mounting part 201, a power device 235, a power conversion device 237, a solar collector 240, and a control device 290. A duplicated description of components (e.g., the mounting part 201, the power device 235, the power conversion device 237, and the control device 290) of the same names as components of a charging stand 100 of FIG. 1 among the components of the charging stand 200 of FIG. 5 may be replaced with the above-mentioned description of FIG. 1.

For example, the mounting part 201 may include a charging part 210 and a holding part 220. As an example, the charging part 210 may include a wireless charging part (e.g., a wireless charging part 111 of FIG. 3) and/or a wired charging part. The case where the charging stand 200 includes the one mounting part 201 is illustrated in FIG. 5, and this is illustrative. In some implementations, the charging stand 200 may further include a plurality of mounting parts (e.g., a first mounting part 201a, a second mounting part 201b, and/or a third mounting part 201c of FIGS. 6A and 6B) which are the same as or similar to the mounting part 201 shown in FIG. 5. For example, the charging stand 200 may further include at least one display device. As an example, the display device may include a display which displays a plurality of pieces of content including information associated with an operation state of the charging stand 200, advertising information, manager information, and/or user information.

As an example, the wireless charging part may include a housing, a coil, a front case, a rear case, and a hinge. A description of the structure of the wireless charging part may be replaced with the above-mentioned description of the wireless charging part 111 of FIG. 3.

As an example, the wired charging part may include at least one wired charging terminal (e.g., a wired charging terminal 131 of FIG. 3). For example, the wired charging part may include a cable connected with a part (e.g., a connector) of a micromobility. The wired charging terminal may be connected with the micromobility in a wired manner to transmit power for charging the micromobility.

As an example, the holding part 220 may be a component where the micromobility docks with the charging stand 200.

For example, the power device 235 may receive power supplied from the outside.

As an example, the power device 235 may receive power supplied from an external power station and may transmit at least a portion of the received supplied power to the power conversion device 237 or the charging part 210.

For example, the power conversion device 237 may include at least one converter or an inverter.

As an example, the power conversion device 237 may include an alternating current/direct current (AC/DC) converter, a DC/AC inverter, and/or a DC/DC converter.

As an example, the power conversion device 237 may convert a DC voltage into an AC voltage or may convert an AC voltage into a DC voltage, using the converter and/or the inverter.

For example, the solar collector 240 may include at least one solar panel.

As an example, the solar panel may receive sunlight to generate power. The solar collector 240 may be formed on, for example, an upper end of the charging stand 200. In other words, the solar collector 240 may be formed as a roof of the charging stand 200. The solar collector 240 may receive sunlight through the solar panel and may generate power using the received sunlight.

For example, the control device 290 may be electrically connected with the charging part 210, the power device 235, the power conversion device 237, the solar collector 240, energy storage 291, and/or a controller 293. As an example, the control device 290 may control the solar collector 240 to receive power or supply power to the charging part 210.

For example, the control device 290 may identify solar power obtained using the solar collector 240 by means of the power device 235.

For example, the control device 290 may convert the identified supplied power by means of the power conversion device 237.

As an example, the control device 290 may convert the solar power into a specified DC voltage, using the AC/DC converter included in the power conversion device 237.

For example, the control device 290 may convert the solar power obtained using the solar collector 240 into a DC voltage by means of the DC/DC converter. The solar power may correspond to 30 VDC and may be converted into a DC voltage of 24 VDC, 36 VDC, or 48 VDC by the DC/DC converter, but such numerical values are illustrative. The control device 290 may transmit at least a portion of the DC voltage converted by means of the DC/DC converter to the outside in a wired manner or may output the at least a portion of the DC voltage to the DC/AC inverter included in the power conversion device 237.

For example, the controller 293 may control the solar collector 240.

As an example, the controller 293 may control a period, an operation duration, an operation end reservation time, or the like for obtain solar power of the solar collector 240.

As an example, the controller 293 may distribute at least a portion of the solar power obtained from the solar collector 240 to the energy storage 291 and/or the power conversion device 237.

For example, the controller 293 may identify whether the solar power is less than a threshold. The threshold may be a predetermined setting value or a setting value capable of being changed by a manager.

As an example, when it is identified that the solar power is less than the threshold, the controller 293 may transmit corresponding information to the control device 290.

As an example, when identifying that the solar power is less than the threshold based on receiving the information, the control device 290 may selectively supply or block power to the plurality of mounting parts. For example, when the solar power is less than the threshold, the control device 290 may identify power supply priorities or power blocking priorities of the plurality of mounting parts. The priorities may be predetermined setting values or setting values capable of being changed by a user or a manager. The control device 290 may supply power for charging to the plurality of mounting parts, based on the identified priorities.

The components of the charging stand 200, which are shown in FIG. 5, are illustrative and implementations of the present disclosure are not limited thereto. The charging stand 200 may further include a component. For example, the charging stand 200 may further include at least one or more display devices (e.g., a display device 250 of FIG. 6A).

For example, the display device may identify mounting parts on which the micromobilities are mounted among the plurality of mounting parts included in the charging stand 200 and may display amounts of power of the identified mounting parts, a state of charge of each of the mounted micromobilities, and/or information about each of the micromobilities.

As an example, when it is identified that the user exists in a region adjacent to the charging stand 200, the display device may display a state of charge of the micromobility mounted on the mounting part 201 under control of the control device 290.

For example, the display device may display an advertisement.

As an example, when it is identified that the user does not exist in the region adjacent to the charging stand 200, the display device may be configured to stop displaying the advertisement on the display device under control of the control device 290.

As an example, the display device may be configured to always display an advertisement under control of the control device 290. The control device 290 may identify a user input associated with displaying the advertisement on the display device. As an example, the user input may be a touch input on one region of the display device. As an example, the user input may be a control signal transmitted to the control device 290. The control device 290 may control the display device to always display an advertisement, based on identifying the user input.

For example, the display device may separately display a power state of the charging stand 200 into a plurality of states.

As an example, the display device may separately display solar power of the charging stand 200 and a remaining amount (or an available amount) of supplied power received from the outside.

For example, the display device may stop its operation based on whether the solar power is less than the threshold.

As an example, when the control device 290 identifies that the solar power is less than the threshold, the display device may block the transmitted power in preference to the mounting part 201.

For example, the control device 290 may monitor efficiency of a charging operation of the micromobility using the solar power. The control device 290 may identify that the efficiency of the charging operation using the solar power is degraded.

As an example, when it is identified that the efficiency is degraded, the control device 290 may switch the charging operation using the solar power to a charging operation according to the above-mentioned implementation of FIG. 1.

FIG. 6A is a perspective view schematically illustrating a charging stand 200. FIG. 6B is a perspective view schematically illustrating a charging stand 200.

Referring to FIGS. 6A and 6B, in some implementations, the charging stand 200 may include a plurality of mounting parts 201, a solar collector 240, a display device 250, and a control box 299. For example, the charging stand 200 may include a first mounting part 201a, a second mounting part 201b, and a third mounting part 201c. For example, the control box 299 may include at least some of the components of the charging stand 200 shown in FIG. 5.

In some implementations, each of the first mounting part 201a, the second mounting part 201b, and the third mounting part 201c may include at least some of components (e.g., a charging part 210 and/or a holding part 220) which are the same as the above-mentioned components included in the mounting part 201 of FIG. 5.

In some implementations, a power device 235, a power conversion device 237, and/or a control device 290 may be included in the control box 299 disposed on one region of the charging stand 200. At least one component may be disposed on the outside of the control box 299 (e.g., a specific space between the control box 299 and the plurality of mounting parts 201). For example, the control box 299 may be defined as a box having a material which is the same as or similar to a frame of the charging stand 200.

For example, each of the plurality of mounting parts 201 may transmit power for charging to one micromobility. As an example, one or more of the plurality of mounting parts 201 may operate at the same time.

For example, power transmitted to at least one micromobility by the plurality of mounting parts 201 may include electrical energy generated by converting solar power obtained by means of the solar collector 240 or at least a portion of commercial power received by the control device 290 by means of the power device 235 from the outside (e.g., a power station).

In some implementations, the solar collector 240 may include at least one solar panel.

For example, the solar collector 240 may generate solar power using the at least one solar panel under control of a controller 293.

For example, the solar collector 240 may be famed on an upper end of the charging stand 200. In other words, the solar collector 240 may be famed as a roof of the charging stand 200.

For example, the power conversion device 237 may convert the generated (or obtained) solar power into electrical energy (e.g., power) using the solar collector 240. The charging stand 200 may include energy storage 291 which stores at least a portion of the converted electrical energy. As an example, the energy storage 291 may include an energy storage system (ESS).

Figure 7:
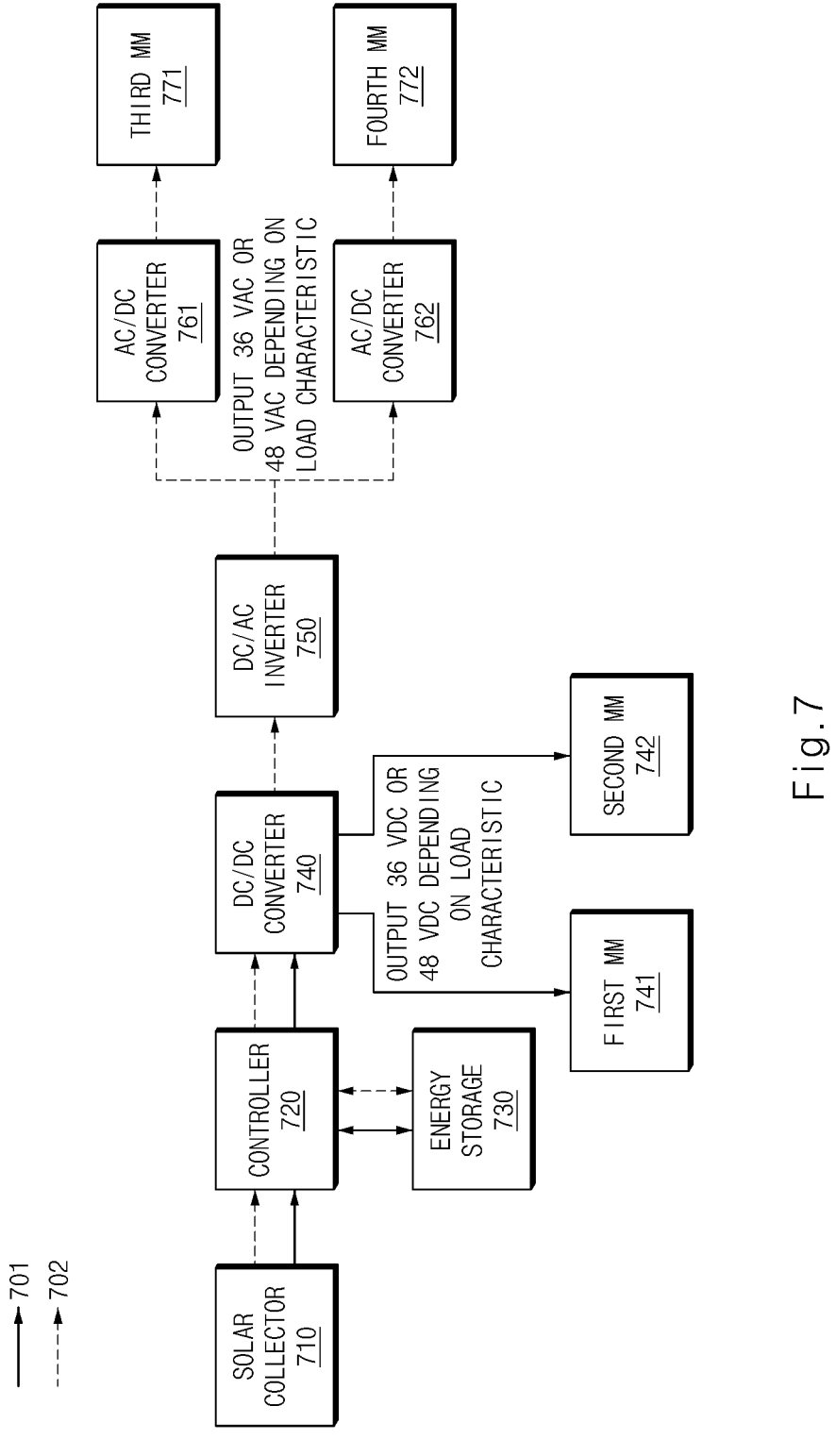
FIG. 7 is a drawing illustrating operational flow of charging a micromobility in a charging stand.

For example, the power conversion device 237 (e.g., a power conversion device 137 of FIG. 1) may further include a DC/DC converter (e.g., a DC/DC converter 740 of FIG. 7). As an example, the control device 290 may include the DC/DC converter. As an example, the control device 290 may identify solar power obtained by means of the solar collector 240 by means of the controller 293, may output at least a portion of the received solar power to the energy storage 291 or the DC/DC converter, using the controller 293, may convert the at least a portion of the electrical energy, which is output to the DC/DC converter, into a specified DC voltage.

For example, the charging stand 200 may further include the controller 293 electrically connected with the mounting part 201, the solar collector 240, and/or the energy storage 291. As an example, the controller 293 may be electrically connected with the power conversion device 237, the solar collector 240, and/or the energy storage 291. As an example, the controller 293 may control a light receiving operation of the solar collector 240 or may distribute the obtained solar power to the charging part 210 and/or the energy storage 291.

For example, when identifying that the solar power is less than a threshold, the control device 290 may selectively supply or block power to the plurality of mounting parts 201. For example, when the solar power is less than the threshold, the control device 290 may identify power supply priorities or power blocking priorities of the plurality of mounting parts 201. The priorities may be predetermined setting values or setting values capable of being changed by a manager. The control device 290 may supply power for charging to the plurality of mounting parts 201, based on the identified priorities.

As an example, when it is identified that the first mounting part 201*a*, the second mounting part 201*b*, and the third mounting part 201*c* have power supply priorities of a first ranking, a second ranking, and a third ranking, respectively, the control device 290 may supply power for charging in the order.

As an example, when it is identified that the first mounting part 201*a*, the second mounting part 201*b*, and the third mounting part 201*c* have power blocking priorities of a first ranking, a second ranking, and a third ranking, respectively, the control device 290 may block the supply of power for charging in the order.

For example, the control device 290 may monitor efficiency of a charging operation of the micromobility using the solar power. The control device 290 may identify that the efficiency of the charging operation using the solar power is degraded.

As an example, when it is identified that the efficiency is degraded, the control device 290 may switch the charging operation using the solar power to a charging operation according to the above-mentioned implementation of FIG. 1.

In some implementations, the charging stand 200 may further include a component. For example, the charging stand 200 may further include a watt-hour meter (e.g., an integrated watt-hour meter), a power indicator lamp, a power fuse, a protective relay, and/or a plurality of breakers. The description of the components may be replaced with the above-mentioned description of FIG. 2.

In some implementations, reference numeral 610 of FIG. 6B may be referred as a conceptual diagram when looking at the charging stand 200 from the front surface.

For example, a horizontal length of the solar collector 240 of the charging stand 200 may be 2,600 mm.

For example, a horizontal length between frames of the charging stand 200 may be 2,560 mm. As an example, a distance from a left frame of the charging stand 200 to a right frame of the charging stand 200 may be 2,560 mm. In other words, the solar collector 240 may be formed to partially protrude from the left and right frames of the charging stand 200.

For example, a length from the ground to the solar collector 240 may be 2,524 mm. As an example, a distance from the ground to the top of the charging stand 200 including the solar collector 240 may be 2,524 mm.

For example, a distance from the ground to an upper frame may be 1,996 mm. As an example, a distance from the ground to the upper frame on which the solar collector 240 is mounted may be 1,996 mm.

For example, a horizontal length of a region formed by each of the plurality of mounting parts 201 may be 700 mm. As an example, a horizontal length of a region formed by the first mounting part 201*a* from the left frame to a region formed by the second mounting part 201*b* may be 700 mm. As an example, a horizontal length of a region formed by the second mounting part 201*b* between the first mounting part 201*a* and the third mounting part 201*c* may be 700 mm. As an example, a horizontal length of a region formed by the third mounting part 201*c* from one end of the control box 299 and a region formed by the second mounting part 201*b* may be 700 mm.

For example, a horizontal length of the control box 299 may be 300 mm.

In some implementations, reference numeral 620 may be referred as a conceptual diagram when looking at the charging stand 200 from the side surface.

For example, when looking at the charging stand 200 from the side surface, a straight length between both ends of the solar collector 240 may be 1,020 mm.

For example, a straight length of the left frame including the display device 250 may be 580 mm.

The above-mentioned numerical values about the structure and length of the charging stand 200 are illustrative, and implementation of the present disclosure is not limited thereto.

FIG. 7 is a drawing illustrating operational flow of charging a micromobility in a charging stand.

In some implementations, reference numeral 701 may be defined as a power flow diagram for wired charging between the charging stand and the micromobility.

In some implementations, reference numeral 702 may be defined as a power flow diagram for wireless charging between the charging stand and the micromobility.

In some implementations, the charging stand (e.g., a charging stand 200 of FIG. 5) may include a controller 720 (e.g., a controller 293 of FIG. 1), energy storage 730 (e.g., energy storage 291 of FIG. 1), a DC/DC converter 740, and a DC/AC inverter 750. For example, the components may be implemented as one component of a control device (e.g., a control device 290 of FIG. 5) of the charging stand. The above-mentioned configuration of the control device is illustrative, and the charging stand may further include components. For example, the charging stand may further include an AC/DC converter (e.g., an AC/DC converter 420 of FIG. 4) electrically connected with the DC/AC inverter 750 and configured to receive commercial power from the outside and convert the received commercial power into a specified DC voltage. As an example, the AC/DC converter may be electrically connected with a power device (e.g., a power device 410 of FIG. 4). The AC/DC converter may convert at least a portion of the supplied power received from the outside by the power device into a DC voltage.

In some implementations, the charging stand may obtain electrical energy (or power) using a solar collector 710 (e.g., a solar collector 240 of FIG. 5). For example, the charging stand may convert solar power obtained by means of the solar collector 710 into electrical energy.

In some implementations, the charging stand may identify solar power obtained from the solar collector 710, by means of the controller 720 included therein. For example, the charging stand may output at least a portion of the power identified by means of the controller 720 to the energy storage 730 and/or the DC/DC converter 740.

In some implementations, the energy storage 730 may store power transmitted by control of the controller 720. For example, the energy storage 730 may be an ESS.

In some implementations, the charging stand may convert power into a DC voltage using the DC/DC converter 740. For example, the charging stand may output at least a portion of the specified DC voltage converted using the DC/DC converter 740 to a wired charging part and/or the DC/AC inverter 750.

For example, the charging stand may determine a magnitude of a DC voltage to be converted based on a load characteristic of the micromobility and may convert power into a specified DC voltage having the determined magnitude using the DC/DC converter 740. As an example, the charging stand may determine a magnitude of a DC voltage for charging based on a maximum load current and/or a load voltage range of the micromobility and may convert the solar power obtained from the solar collector 710 into the specified DC voltage having the determined magnitude under control of the controller 720.

In some implementations, the charging stand may transmit the specified DC voltage converted using the DC/DC converter 740 to the micromobility in a wired manner. As an example, the charging stand may transmit the converted specified DC voltage to the micromobility by means of the wired charging part.

For example, when it is identified that a first micromobility (MM) 741 is connected with a wired charging part (e.g., a wired charging terminal 131 of FIG. 3) included in the wired charging part, the charging stand may convert a portion of supplied power into 36 VDC based on a load characteristic of the first MM 741 and may transmit 36 VDC to the first MM 741 through the wired charging terminal.

For example, when it is identified that a second MM 742 is connected with the wired charging terminal included in the wired charging part, the charging stand may convert a portion of the supplied power into 48 VDC based on a load characteristic of the second MM 742 and may transmit 48 VDC to the second MM 742 through the wired charging terminal.

In some implementations, the charging stand may convert a specified DC voltage into an AC voltage using the DC/AC inverter 750. For example, the charging stand may output at least a portion of the AC voltage converted using the DC/AC inverter 750 to a wireless charging part (e.g., a wireless charging part 111 of FIG. 3).

For example, the charging stand may determine a magnitude of an AC voltage to be converted based on a load characteristic of the micromobility and may convert voltage into a specified AC voltage having the determined magnitude using the DC/AC inverter 750. As an example, the charging stand may determine a magnitude of an AC voltage for charging based on a maximum load current and/or a load voltage range of the micromobility and may convert the specified DC voltage converted by the DC/DC converter 740 into a specified AC voltage having the magnitude using the DC/AC inverter 750.

In some implementations, the charging stand may wirelessly transmit the specified AC voltage converted using the DC/AC inverter 750 to the micromobility. As an example, the charging stand may transmit the converted specified AC voltage to the micromobility by means of the wireless charging part.

For example, when it is identified that a third MM 771 is spaced apart from the wireless charging part within a specified distance, the charging stand may transmit the determined and converted specified AC voltage of 36 VAC to an RX module of the third MM 771 based on a load characteristic of the third MM 771. The third MM 771 may convert the received AC voltage of 36 VAC into a DC voltage, using the AC/DC converter 761 included in the RX module. As an example, when the distance between the wireless charging part and the third MM 771 is within a specified distance, the charging stand may include a physical contact state between the wireless charging part and the third MM 771.

For example, when it is identified that a fourth MM 772 is spaced apart from the wireless charging part within a specified distance, the charging stand may transmit the determined and converted specified AC voltage of 48 VAC to an RX module of the fourth MM 772 based on a load characteristic of the fourth MM 772. The fourth MM 772 may convert the received AC voltage of 48 VAC into a DC voltage, using the AC/DC converter 762 included in the RX module. As an example, when the distance between the wireless charging part and the fourth MM 772 is within a specified distance, the charging stand may include a physical contact state between the wireless charging part and the fourth MM 772.

Figure 8:
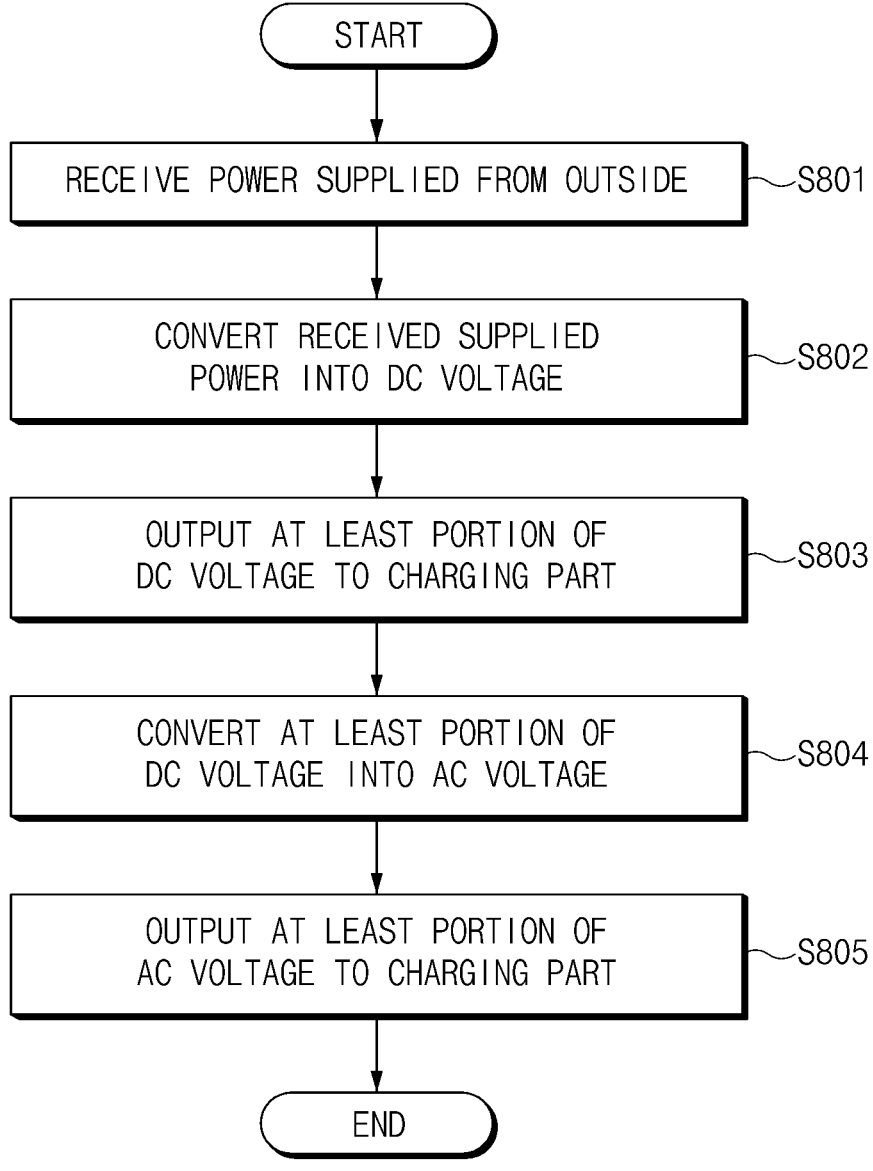
FIG. 8 illustrates an operational flowchart of a charging stand.

FIG. 8 illustrates an operational flowchart of a charging stand. Hereinafter, it is assumed that the charging stand having components of FIGS. 1 and/or 5 performs a process of FIG. 8. Furthermore, in a description of FIG. 8, an operation described as being performed by the charging stand may be understood as being controlled by control device(s) 190 and/or 290 of the charging stand(s) of FIGS. 1 and/or 5.

In S801, the charging stand may receive power supplied from the outside.

As an example, the charging stand may receive power supplied from the outside using a power device, based on that at least one micromobility is mounted on a mounting part of the charging stand.

As an example, the charging stand may include a solar collector formed in the charging stand and including at least one solar panel for generating solar power using sunlight, energy storage for storing the solar power, and a controller electrically connected with the solar collector and the energy storage. Alternatively or in addition to the operation of receiving the power supplied from the outside, the charging stand may control the controller to generate the solar power by means of the solar collector.

In S802, the charging stand may convert the received supplied power into a DC voltage.

As an example, the charging stand may include a power conversion device and a wired charging part. When the wired charging part and the at least one micromobility are connected with each other, the charging stand may identify a load characteristic of the at least one micromobility connected with the wired charging part, may determine a magnitude of a voltage for charging the at least one micromobility, based on the identified load characteristic, and may convert the supplied voltage into the specified DC voltage having the determined magnitude, using the AC/DC converter included in the power conversion device.

In S803, the charging stand may output at least a portion of the DC voltage to a charging part.

As an example, the charging stand may transmit at least a portion of the specified DC voltage to the micromobility by means of the wired charging part.

In S804, the charging stand may convert at least a portion of the DC voltage into an AC voltage.

As an example, the charging stand may include a wireless charging part. When a separation distance between the wireless charging part and the at least one micromobility is within a specified distance, the charging stand may identify a load characteristic of the at least one micromobility, may determine a magnitude of a voltage for charging the at least one micromobility, based on the identified load characteristic, and may convert the specified DC voltage into the specified AC voltage having the determined magnitude, using the DC/AC converter.

In S805, the charging stand may output at least a portion of the AC voltage to the charging part.

As an example, the charging stand may transmit the specified AC voltage to the at least one micromobility by means of the wireless charging part.

A description will be given of effects of the method for charging the micromobility and the charging stand therefor.

In some implementations, the method for charging the micromobility and the charging stand therefor may be provided to increase convenience by providing facilities for satisfying both of charging and storage which are elements necessary to use the micromobility.

Furthermore, in some implementations, the method for charging the micromobility and the charging stand therefor may be provided to provide an eco-friendly infrastructure by providing a charging function using power received from the outside (e.g., a power station) and power obtained using sunlight.

In addition, various effects ascertained directly or indirectly through the present disclosure may be provided.

What is claimed is:

1. A charging stand configured to receive and charge at least one micromobility device, the charging stand comprising:

a power device configured to supply power;

a mounting part including a charging part and a holding part that are configured to receive the at least one micromobility device;

a power conversion device including at least one converter or an inverter; and a control device configured to, based on the at least one micromobility device being received at the mounting part, execute an operation for charging the at least one micromobility device, wherein the control device is configured to:

receive power supplied from the power device, convert the supplied power into a specified direct current (DC) voltage using the power conversion device, output at least a portion of the specified DC voltage to the charging part, convert the specified DC voltage into a specified alternating current (AC) voltage using the power conversion device, and output at least a portion of the specified AC voltage to the charging part.

2. The charging stand of claim 1, wherein the charging part includes a wireless charging part that includes:

a housing defining an opening;

a coil received at the opening and configured to wirelessly supply power to the at least one micromobility device;

a front case covering a first surface of the coil, the first surface facing the at least one micromobility device;

a rear case that covers a second surface opposite to the first surface of the coil and that includes a buffer spring facing the housing; and a hinge coupling the buffer spring to the housing.

3. The charging stand of claim 1, wherein the charging part includes a wireless charging part, and wherein the control device is configured to:

based on a separation distance between the wireless charging part and the at least one micromobility device being within a specified distance, transmit the specified AC voltage to the at least one micromobility device using the wireless charging part.

4. The charging stand of claim 3, wherein the power conversion device includes an AC/DC converter and a DC/AC inverter, and wherein the control device is configured to:

identify a load characteristic of the at least one micromobility device, determine, based on the identified load characteristic, a magnitude of a voltage for charging the at least one micromobility device, convert the supplied power into the specified DC voltage, using the AC/DC converter, convert the specified DC voltage into the specified AC voltage having the determined magnitude, using the DC/AC inverter, and transmit the specified AC voltage to the at least one micromobility device using the wireless charging part.

5. The charging stand of claim 1, wherein the charging part includes a wired charging part, and wherein the control device is configured to:

based on the wired charging part and the at least one micromobility being connected to each other, transmit the specified DC voltage to the at least one micromobility device using the wired charging part.

6. The charging stand of claim 5, wherein the power conversion device includes an AC/DC converter and a DC/AC inverter, and wherein the control device is configured to:

identify a load characteristic of the at least one micromobility device connected to the wired charging part, determine, based on the identified load characteristic, a magnitude of a voltage for charging the at least one micromobility device, convert the supplied power into the specified DC voltage having the determined magnitude, using the AC/DC converter, and transmit the specified DC voltage to the at least one micromobility device using the wired charging part.

7. The charging stand of claim 1, further comprising:

a solar collector provided at the charging stand and including at least one solar panel configured to generate solar power;

an energy storage configured to store the solar power; and a controller electrically connected to the solar collector and the energy storage, wherein the power conversion device includes a DC/DC converter and a DC/AC inverter.

8. The charging stand of claim 7, wherein the charging part includes a wireless charging part and a wired charging part, and wherein the control device is configured to:

identify the solar power generated by the solar collector, using the controller, output at least a portion of the identified solar power to the energy storage or the DC/DC converter by means of the controller, convert the at least a portion of the solar power into the specified DC voltage, using the DC/DC converter, and output the specified DC voltage to the wired charging part or the DC/AC inverter, convert the specified DC voltage into the specified AC voltage, using the DC/AC inverter, and output the specified AC voltage to the wireless charging part, and transmit the specified DC voltage or the specified AC voltage to the at least one micromobility device using the wired charging part or the wireless charging part.

9. The charging stand of claim 7, further comprising:

at least one display device configured to display content, wherein the control device is configured to:

based on the solar power being less than a threshold, block power transmitted to the at least one display device.

10. The charging stand of claim 7, wherein the mounting part includes a plurality of mounting parts that are electrically connected to the control device, wherein the control device is configured to:

based on the solar power being less than a threshold, identify power supply priorities or power blocking priorities of the plurality of mounting parts, and supply power for charging the at least one micromobility device to the plurality of mounting parts, based on the power supply priorities or the power blocking priorities.

11. The charging stand of claim 1, further comprising:

a watt-hour meter configured to measure an amount of power transmitted to the at least one micromobility device using the mounting part;

a power indicator lamp configured to display a power state of the charging stand using a lamp with a plurality of colors; and a power fuse and a protective relay provided in at least a portion of a transmission and reception path among the control device, the mounting part, and the at least one micromobility device.

12. The charging stand of claim 1, further comprising:

a main breaker and a plurality of sub-breakers, wherein the main breaker includes an earth leakage breaker, and wherein the plurality of sub-breakers include a power distribution breaker.

13. The charging stand of claim 1, further comprising:

at least one display device configured to display content, wherein the control device is configured to:

display, based on a user being identified in a region adjacent to the charging stand, a charging state of each of the at least one micromobility device received at the mounting part on the at least one display device.

14. The charging stand of claim 13, wherein the control device is configured to:

display an advertisement on the at least one display device, and based on the user not being identified in the region adjacent to the charging stand, stop displaying the advertisement on the at least one display device.

15. The charging stand of claim 13, wherein the control device is configured to:

identify a user input for displaying an advertisement on the at least one display device, and display the advertisement on the at least one display device, based on identifying the user input.

16. A method for charging a micromobility device in a charging stand, method comprising:

receiving, based on at least one micromobility device being received at a mounting part of the charging stand, power supplied from a power device, by a control device;

converting, by the control device, the received power into specified DC voltage using a power conversion device;

outputting, by the control device, at least a portion of the specified DC voltage to a charging part using the power conversion device;

converting, by the control device, the at least a portion of the specified DC voltage into a specified AC voltage using the power conversion device; and outputting, by the control device, at least a portion of the specified AC voltage to the charging part.

17. The method of claim 16, wherein the charging part includes a wireless charging part, wherein the method further comprises:

transmitting, based on a separation distance between the wireless charging part and the at least one micromobility device being within a specified distance, the specified AC voltage to the at least one micromobility device using the wireless charging part, by the control device.

18. The method of claim 17, wherein the power conversion device includes an AC/DC converter and a DC/AC inverter, wherein the method further comprises:

determining, by the control device, a magnitude of a voltage for charging the at least one micromobility device;

converting, by the control device, the supplied power into the specified DC voltage using the AC/DC converter;

converting, by the control device, the specified DC voltage into the specified AC voltage having the determined magnitude using the DC/AC inverter; and transmitting, by the control device, the specified AC voltage to the at least one micromobility device using the wireless charging part.

19. The method of claim 16, wherein the charging part includes a wired charging part, wherein the method further comprises:

transmitting, based on the wired charging part and the at least one micromobility device being connected with each other, the specified DC voltage to the at least one micromobility device using the wired charging part.

20. The method of claim 19, wherein the power conversion device includes an AC/DC converter and a DC/AC inverter, wherein the method further comprises:

identifying, by the control device, a load characteristic of the at least one micromobility device connected to the wired charging part;

determining, by the control device, a magnitude of a voltage for charging the at least one micromobility device based on the identified load characteristic;

converting, by the control device, the supplied power into the specified DC voltage having the determined magnitude using the AC/DC converter; and transmitting, by the control device, the specified DC voltage to the at least one micromobility device using the wired charging part.

* * * * *